CERAMIC DIE AND METHOD OF MAKING SAME

Filed March 13, 1969

INVENTORS.
HARRY E. DEVERELL &
FRANK L. MUSCATELL
By Vincent G. Gioia
Attorney

United States Patent Office 3,613,433

Patented Oct. 19, 1971

3,613,433
CERAMIC DIE AND METHOD OF MAKING SAME

Harry E. Deverell, Craigdell Gardens, and Frank L. Muscatell, Gibsonia, Pa., assignors to Allegheny Ludlum Steel Corporation, Brackenridge, Pa.

Filed Mar. 13, 1969, Ser. No. 807,096
Int. Cl. B21c *3/00*
U.S. Cl. 72—467 3 Claims

ABSTRACT OF THE DISCLOSURE

Described herein is a ceramic die for use in shaping metal by extrusion, drawing, etc., which contains a smooth, continuous coating of vitreous material diffusion bonded to the ceramic body. Also disclosed is a method of making such a ceramic die.

Dies for use in shaping metal have been most commonly constructed of metals and alloys. Such dies have been frequently employed in extrusion, drawing, etc., operations, but have limited and restricted lives since they are subject to wear and breakage. To improve on metallic dies, it has been proposed to use lubricants of various kinds and to employ alternative materials for constructing the dies. Recently it has even been proposed to use soild ceramic dies in various metal shaping operations such as hot extrusion. Such dies have been used with success in lower temperature applications for copper, brass and aluminum. They have also been tried in the various metal industries and with refractory metals. Descriptions of the ceramic dies which have been proposed for use in the metals industries are found in U.S. Pats. 3,208,-262, 3,110,091, 3,110,092, 3,110,589, 3,110,590 and 3,365,317.

While it has been found that ceramic dies offer certain advantages over metallic dies it is still nevertheless highly desirable to increase die life and usage even further and to the greatest extent possible. The present invention provides a novel ceramic die which has proved to have superior resistance to wear and a longer life than heretofore available dies.

Figure 1:
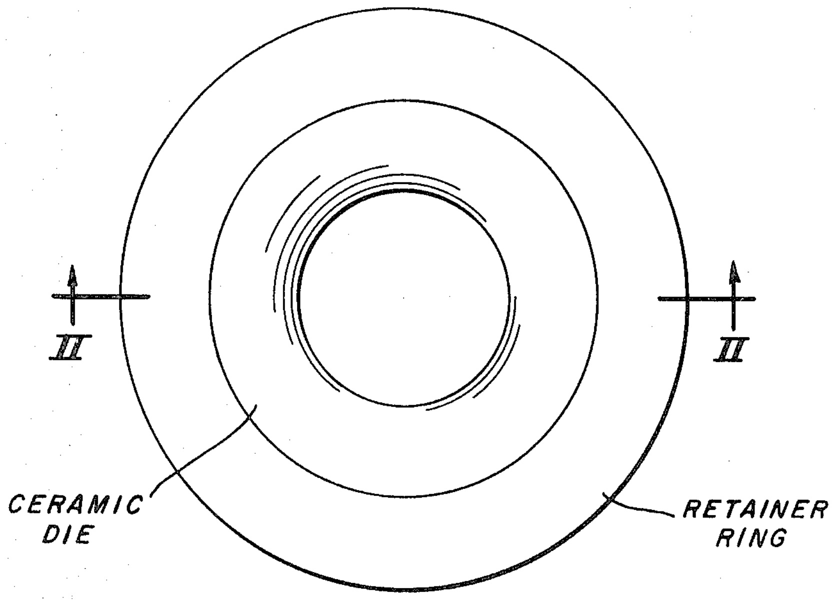
Figure 2:
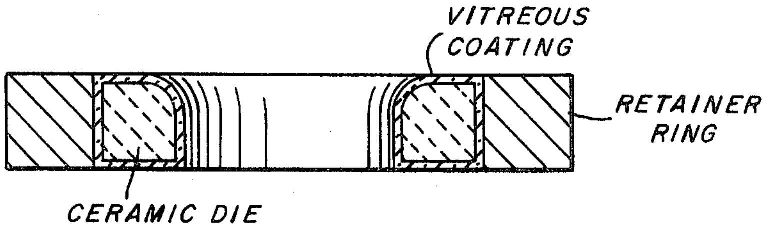

The invention will be better understood from the drawings accompanying this application in which:

FIG. 1 is a top plan view of an exemplary embodiment of a die incorporating the present invention; and FIG. 2 is a vertical cross-sectional view of the die of FIG. 1 as viewed along the plane of the line II—II of FIG. 1.

In accordance with the invention there is provided a die for use in shaping metal such as by extrusion, drawing, etc., which comprises a ceramic body of suitable refractory or ceramic material, having a metal contacting surface and a smooth continuous coating of vitreous material on the metal contacting surface; the coating being diffusion bonded to the ceramic body. Also in accordance with the invention there is provided a method of making a die suitable for prolonged use in shaping metal which comprises providing a ceramic body having a surface adapted to contact metal during metal shaping, coating at least the metal contacting surface of the ceramic body with a vitreous material and diffusion bonding the vitreous coating to the ceramic body. By use of the invention metal may be shaped by working it with a ceramic die having a vitreous coating on the metal contacting surface thereof. Preferred materials for use in accordance with the invention include silicate glass compositions as the vitreous material.

The invention is depicted schematically in the drawing showing the improved die.

The following examples will serve to illustrate the improvement obtained by practicing the invention. A series of extrusion dies were provided of a mixture of zirconia and magnesia. The dies were made by cold pressing and sintering. To provide support and avoid tensile failure during extrusion they were encased by shrink fitting in hardened steel retaianer rings. This was done by heating the retainer ring to a temperature of 900° F. to 950° F. and placing the cold ceramic die into the ring. As the retainer ring cools, the die is compressed. Such supported dies have been found to satisfactorily withstand extrusion pressures of 50,000 to 185,000 p.s.i. or greater. Ceramic dies of the same composition made as described were tested both without a vitreous coating and with a vitreous coating to compare the effectiveness of the vitreous diffusion bonded coating in accordance with the invention.

In one set of tests extrusions were produced using uncoated ceramic dies on 1″ pipes working to internal mill tolerances on outside diameter of 1.305″ O.D.+0.023″ —0.015″. The die dimenensions were measured by telescope gage after extrusion and the dies were removed from service when these tolerances would be exceeded on the plus side by further use of the die or when the die had deteriorated by cracking or breakage. The results of the extrusion tests are described in Table I.

TABLE I

| Die identity | Service life (extrusions) | Failure | Total wear |
|---|---|---|---|
| Z-1 | 3 | Broke | |
| Z-2 | 2 | do | |
| Z-3 | 5 | do | |
| Z-10 | 7 | Wear | .017 |
| Z-27 | 6 | Broke | |
| Z-28 | 2 | do | |

It was found that thermal shock is an important mechanism in the deterioration of the strength and wear resistance of a ceramic die. As will be hereinafter pointed out the presence of a vitreous coating appears to form a more shock resistance face which increases die life.

To compare die life of coated dies, the extrusion tests were performed on a series having vitreous coatings of silicate glass applied to at least the metal contacting surface of the die. The vitreous material was applied by spraying a slurry of ground silicate glass of various compositions with an air brush and thereafter heating to develop a diffusion bond. The heating causes the silicate glass to soften on the surface of the ceramic die and to form a continuous and smooth coating thereon. In the specific cycle employed, the silicate base glasses were heated from room or slightly elevated temperatures to the range of 2300° F. to 2500° F. and subsequently cooled to room temperature in four to ten hours.

The compositions of the vitreous coatings used are described in Table II. The coated dies were used to produce 1″ pipe to the same tolerances disclosed above in connection with the uncoated dies. The results of the extrusion tests are reported in Table III.

TABLE II

| Glaze identity | Code No. | Feldspar | Calcium carbonate | Florida plastic kaolin | Flint |
|---|---|---|---|---|---|
| 7 | 1 | 36 | 10 | 16 | 38 |
| 7A | 2 | 28 | 10 | 16 | 46 |
| 7B | 3 | 20 | 10 | 16 | 54 |
| 7C | 4 | 12 | 10 | 16 | 62 |
| 7D | 5 | 4 | 10 | 16 | 70 |
| 7E | 6 | ---- | 10 | 16 | 74 |
| 7G | 8 | 24 | 10 | 16 | 50 |
| 7H [1] | 9 | 20 | 10 | 16 | 54 |

[1] Duplicate of 7B.

Mineral compositions are as follows: Feldspar approximately 68.3 $SiO_2$, 17.6 $Al_2O_3$, 11.1 $K_2O$, 2.3 $Na_2O$; Florida plastic kaolin approximately 49.1 $SiO_2$, 38.7 $Al_2O_3$;

calcium carbonate was relatively pure; flint was nearly pure $SiO_2$.

TABLE III

| Die identity | Service life (extrusions) | Failure | Total wear |
|---|---|---|---|
| Z-6-G-1 | [1] 7 | Chip [2] | .014 |
| Z-8-G-1 | [1] 6 | do [2] | .011 |
| Z-12-G-1 | [1] 7 | None | .008 |
| Z-13-G-1 | 5 | Broke | |
| Z-20-G-2 | 4 | Moderate chip [2] | .003 |
| Z-22-G-3 | 5 | Chip | .007 |
| Z-23-G-4 | [1] 7 | None | .009 |
| Z-24-G-4 | 4 | Chip | .007 |
| Z-25-G-5 | [1] 7 | None | .009 |
| Z-26-G-5 | 4 | Chip | .003 |
| Z-15-G-1 [3] | 12 | Wear | .023 |
| Z-17-G-1 | 5 | Broke | .002 |
| Z-30-G-8 | 8 | None | .010 |
| Z-31-G-8 | 5 | Broke | .006 |
| Z-32-G-9 | [1] 7 | None | .013 |
| Z-33-G-9 | 2 | Broke | .001 |

[1] Still good.
[2] Judged in condition for further extrusion but removed from service to measure diameter.
[3] This die had worn through glaze plus diffusion layer before wearing out of size.

It is apparent from the comparison of the data above that ceramic dies to which has been applied a coating of vitreous material that is diffusion bonded to the body, exhibits materially improved service life and considerably less total wear. It is noted, for example, that five of six uncoated dies broke in tests after a service life of from two to six extrusions. A seventh uncoated die produced seven extrusions but exhibited a total wear of 0.017". In contrast, coated dies in accordance with the invention had a longer service life and exhibited substantially less total wear on the average.

It is evident from the above that various vitreous materials may be employed in addition to the silicate glasses noted. It has also been found that the application of the vitreous material and the exposure thereof to elevated temperatures to cause diffusion bonding may have the effect of increasing the sintered density of the ceramic body and subsequent strength and wear resistance. Another aspect of the invention is that the surface of the vitreous coated die is much finer and smoother than the surfaces of uncoated dies. Improved smoothness allows extrusions to be made more easily by reducing friction at the die and allows reduction in cost of production by substituting a rough finishing operation for the usual grinding practices employed. Surface smoothness may be measured by a "Profiliometer" such as Model 741 which is produced by Micromatic Manufacturing Company, Ann Arbor, Mich. Such a device measures the hills and valleys of the surface and provides a measurement of the smoothness as the root mean square (RMS). A typical uncoated die which has been rough ground will have a smoothness of about 130 RMS. In contrast, coated dies in accordance with the invention will have a smoothness of not greater than about 50 RMS. It is common to produce coated dies of a smoothness on the order of about 8 RMS by practicing the invention.

Although in the embodiment described above vitreous material was applied in solid form by spraying a slurry with an air brush onto the metal contacting surface of the die, other techniques of application may be used. For example, it is also possible to apply the vitreous material in molten form by dipping the ceramic die into molten glass.

The invention similarly is not restricted to specific ceramic materials for use as a die body. Any ceramic, i.e. refractory material, may be employed which is capable of being used in shaping metal such as by extrusion or drawing. Regardless of which material is selected to use as a die, it will be improved by applying to the metal contacting surface thereof a vitreous diffusion bonded coating in accordance with the present invention.

We claim:

1. In a die for use in shaping metal by extrusion, drawing, and the like, which comprises (1) a body of ceramic material having at least one aperture therein for the passage of metal therethrough to work same whereby the shape and/or cross section of the metal entering and exiting said die is dissimilar, and (2) means to support said ceramic body to avoid tensile failure in use; the improvement in said die which comprises: providing the surface of said ceramic body responsible for the working of metal with a smooth, continuous coating of vitreous material on said surface and heating said coated die to diffusion bond said coating to said ceramic body whereby the resulting die is characterized by increased strength, wear resistance and thermal shock resistance as compared with an otherwise similar die which has not been provided with said diffusion bonded coating.

2. A die according to claim 1 wherein said ceramic body is annularly configured and said support means comprise metal retaining means surrounding said ceramic body.

3. A die according to claim 1 wherein said vitreous material is a silicate glass.

References Cited

UNITED STATES PATENTS

| | | | |
|---|---|---|---|
| 1,096,688 | 5/1914 | Dantsizen | 72—467 UX |
| 2,934,667 | 4/1960 | Pincus | 117—125 X |
| 3,394,026 | 7/1968 | Parr et al. | 117—125 |

MILTON S. MEHR, Primary Examiner

U.S. Cl. X.R.

117—95, 125